United States Patent [19]

von der Crone

[11] 4,384,057
[45] May 17, 1983

[54] COMPOSITION CONTAINING A CONDENSATION PRODUCT OF 1,3-DIIMINOISOINDOLINE AND CYANOACETIC ANILIDE USED TO PIGMENT AN ORGANIC LACQUER RESIN

[75] Inventor: Jost von der Crone, Riehen, Switzerland

[73] Assignee: Ciba-Geigy Corporation, Ardsley, N.Y.

[21] Appl. No.: 146,581

[22] Filed: May 5, 1980

[30] Foreign Application Priority Data

May 14, 1979 [CH] Switzerland .................. 4467/79

[51] Int. Cl.$^3$ .................. C08K 5/20; C08K 5/34
[52] U.S. Cl. .................. 523/456; 523/508; 524/87; 524/512; 524/563; 524/577; 524/585; 524/597
[58] Field of Search .............. 260/37 N, 37 NP, 37 P, 260/38, 39 P, 42.21; 524/94, 87; 523/461, 456, 455, 508

[56] References Cited

U.S. PATENT DOCUMENTS

| | | |
|---|---|---|
| 3,646,033 | 2/1972 | Leister et al. |
| 3,794,659 | 2/1974 | Leister et al. |
| 4,051,099 | 9/1977 | von der Crone |
| 4,116,959 | 9/1978 | von der Crone .................. 524/87 |
| 4,259,488 | 3/1981 | von der Crone .................. 524/87 |
| 4,262,120 | 4/1981 | von der Crone |

FOREIGN PATENT DOCUMENTS

| | | |
|---|---|---|
| 19588 | 11/1980 | European Pat. Off. .............. 524/87 |
| 558403 | 1/1975 | Switzerland . |
| 2024838 | 1/1980 | United Kingdom . |

OTHER PUBLICATIONS

Derwent Abst. 67915 C/39 (9-18-80) BASF, DT 2909567.
Derwent Abst. 69860 C/40 (9-25-80) BASF, DT 2909644.
Derwent Abst. 69861 C/40 (9-18-80) BASF, DT 2909645.
Chem. Abs., vol. 9, 40207n, 1979, Isoindoline Pigments, DT 2814526.
Derwent Abst. 52779 (B/29) (7-12-79), BASF (DT 2800815).
Derwent Abst. 60116 B/33 (8-9-79), Sandoz (DT 2805234).
Derwent Abst. 250 C/01 (12-20-79), Ciba (DT 2924142).
Derwent Abst. 67813 C/39 (9-18-80), BASF (DS 2914086).

Primary Examiner—John C. Bleutge
Assistant Examiner—Herbert J. Lilling
Attorney, Agent, or Firm—Luther A. R. Hall

[57] ABSTRACT

A process for pigmenting organic material of high molecular weight, which comprises the use of a compound of the formula

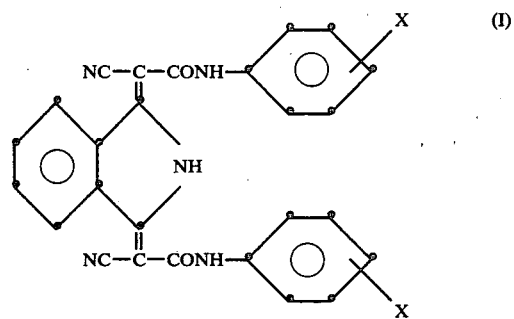

in which X is a meta- or para-positioned fluorine, chlorine or bromine atom. The yellow to scarlet colorations obtained are distinguished by excellent fastness to light and atmospheric influences.

2 Claims, No Drawings

COMPOSITION CONTAINING A CONDENSATION PRODUCT OF 1,3-DIIMINOISOINDOLINE AND CYANOACETIC ANILIDE USED TO PIGMENT AN ORGANIC LACQUER RESIN

The present invention is based on the observation that yellow to red colourations of excellent fastness to light and atmospheric influences are obtained in organic material of high molecular weight by using, as pigments, compounds of the formula

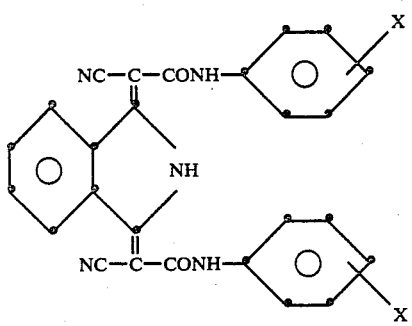

wherein X is a meta- or para-positioned fluorine, chlorine or bromine atom, especially a para-positioned chlorine atom.

The compounds of the formula I can be obtained by known single-step methods by condensation of 1 mole of 1,3-diiminoisoindoline with 2 moles of a cyanoacetic haloanilide.

The pigments of the formula (I) can exist in different crystal modifications. The conversion is effected e.g. by an aftertreatment with a high-boiling solvent in the temperature range from 80° to 200° C. Examples of suitable solvents are: dimethyl formamide, dimethyl acetamide, dimethyl sulfoxide, N-methylpyrrolidone, o-dichlorobenzene, trichlorobenzene or nitrobenzene.

Examples of organic material of high molecular weight are: polyolefins such as polyethylene and polypropylene, polystyrene, aminoplasts, rigid PVC, and preferably lacquers, especially those based on alkyd-melamine-formaldehyde and alkyd-urea resins, as well as thermoplastic and thermohardening acrylic resins, epoxy resin lacquers, isocyanate lacquers or acrylic resin lacquers modified with isocyanates. On account of their excellent fastness to light and atmospheric influences, the pigments of the present invention are most suitable for metallic pigmented paints.

The pigments to be used in the practice of this invention are also of interest for printing inks.

In the process described in German Offenlegungsschrift No. 2,615,394, the compounds of the formula I are obtained in a coarse-crystalline form which is not advantageous for their use as pigments, as they produce weak colourations and impart insufficient brilliance to lacquers. It is therefore advantageous to convert the crude products into a finely dispersed form by grinding or kneading. This is preferably accomplished by using grinding assistants, such as inorganic and/or organic salts in the presence or absence of organic solvents. An advantageous method of attaining the optimum pigment form is the aqueous grinding of the crude pigment in high-speed agitators with grinding elements. Suitable grinding elements are quartz sand or glass or porcelain beads. Discontinuous or continuous mills can be employed. After the grinding procedure, grinding assistants are removed in the conventional manner: soluble inorganic salts e.g. with water, and water-insoluble organic assistants e.g. by steam distillation.

The pigments desirably have a specific surface area of at least 10 $m^2/g$.

The compound of the formula I, wherein X is a chlorine atom in the para-position, is described in German Offenlegungsschrift No. 2 615 394, as is also its use as soluble colourant for colouring linear polyesters in the melt. The polyester fibres are coloured yellow and have a lightfastness of 7 after exposure for 1000 hours. In view of the good solubility of this compound in linear polyesters, it is surprising that it can also be used as pigment in different organic materials of high molecular weight, i.e. that it is suitable for a utility that requires complete insolubility of the colourant in the substrate which it is desired to colour. In view also of the by no means outstanding lightfastness of the yellow colourations obtained with the compounds of the formula I in polyester, it is surprising that the same compound in pigment form produces scarlet colourations of extremely good fastness to atmospheric influences.

The invention is illustrated by the following Examples, in which parts and percentages are by weight.

EXAMPLE 1

With stirring, 11.6 g of diiminoisoindoline and 23.4 g of cyanoacetic 4'-chloroanilide are heated to 100° C. in 300 ml of o-dichlorobenzene. Then 120 ml of acetic acid are added after 1 hour and the reaction mixture is heated under reflux. After 5 hours, the reaction mixture is cooled to 100° C. The pigment is filtered with suction, washed with methanol and water and dried, affording 20.2 g of a coarse-crystalline scarlet powder.

Analysis for $C_{26}H_{15}Cl_2N_5O_2$: calc.: C 62.4 H 3.02 N 14.0 Cl. 14.7. found: 62.2 3.1 14.2 14.1.

For use as pigment, the crude product is advantageously converted into a finely dispersed form by grinding or kneading. Lacquers in which this pigment is incorporated produce strong, scarlet finishes of good gloss, excellent colour saturation and excellent fastness properties, especially excellent fastness to light and atmospheric influences.

The following table lists further pigments which are obtained by substituting equivalent amounts of compounds of the formula

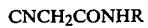

wherein R has the meaning indicated in column 2, for cyanoacetic 4'-chloroanilide, and carrying out the procedure described in this Example. The pigments are distinguished by excellent colour strength and good fastness to light and atmospheric influences.

TABLE

| Example | R | Shade in lacquers |
| --- | --- | --- |
| 2 | 4-bromophenyl | orange |
| 3 | 3-fluorophenyl | yellow |
| 4 | 3-chlorophenyl | yellow |

EXAMPLE 5

The pigment obtained in accordance with Example 2 is briefly heated to reflux temperature in the 20-fold amount of dimethyl formamide. After cooling, the crystalline product is collected with suction. Comparison with the original pigment shows that a new crystal modification results from the aftertreatment.

Strong, scarlet finishes of good fastness properties are obtained with lacquers in which the ground pigment is incorporated. The shade of the new modification is distinctly more bathochrome than that of the pigment of Example 2

EXAMPLE 6

3.9 g of a 30% methanolic solution of sodium methylate are added dropwise to a suspension of 2.8 g of phthalonitrile in 40 ml of methanol. The mixture is stirred for 1½ hours at room temperature, whereupon a solution is obtained. The solution is acidified with 5 ml of formic acid and then 3.9 g of cyanoacetic 4'-chloroanilide and 80 ml of o-dichlorobenzene are added. The mixture is heated to 110° C. while distilling off methanol. After 1 hour, 15 ml of formic acid and 3.9 g of cyanoacetic 4'-chloroanilide are added. The reaction mixture is heated to reflux temperature and then cooled to 100° C. after 3 hours. The pigment is collected with suction, washed with methanol, acetone and water, and dried, affording 6.7 g of a scarlet powder which, after being ground, has the same properties as the pigment described in Example 1.

EXAMPLE 7

24.5 g of an unesterified epoxy resin, 10.5 g of an oil-reactive alkylphenol resin, 35 g of xylene and 30 g of diacetone alcohol are processed to a lacquer and ground for 24 hours in a ball mill with 4 g of the pigment obtained according to Example 1. Scarlet finishes of very good fastness to heat, overstripe bleeding, atmospheric influences and light are obtained after spraying the lacquer onto aluminium sheets and stoving at 120° C.

EXAMPLE 8

Acrylic resin stoving enamel 4 parts of the finely dispersed pigment of Example 1 are stirred into 20 parts of solvent of the following composition: 50 parts of Solvesso 150 (mixture of aromatic hydrocarbons), 15 parts of butyl acetate, 5 parts of Exkin II (ketoxime levelling agent), 25 parts of methyl isobutyl ketone and 5 parts of silicone oil (1% in Solvesso 150). After complete dispersion has been attained (in about 15 to 60 minutes, depending on the type of stirrer), the following binders are added: 48.3 parts of Baycryl L 530 (acrylic resin; 51% in xylene/butanol 3:1) and 23.7 parts of Maprenal TTX (melamine resin; 55% in butanol). After brief homogenisation, the lacquer is applied by conventional methods, such as spraying or dipping, or—particularly for the continuous coating of sheet metal—by the coil coating method, and stoved (stoving for 30 minutes at 130° C.). The scarlet finishes are distinguished by very good levelness, high gloss and excellent dispersion of the pigment, as well as by excellent fastness to atmospheric influences. The colour is almost unchanged even after 2000 hours' exposure in a WEATHER-OMETER.

EXAMPLE 9

4 g of the pigment obtained according to Example 1, 35 g of a 60% solution of an alkyd resin, modified with urea/formaldehyde, in xylene/butanol 1:1, 10 g of oil of terpentine and 5 g of xylene, are ground for 48 hours in a ball mill. After spraying the resultant coloured lacquer onto an aluminium sheet and stoving at 120° C., a scarlet finish of very good fastness to light, atmospheric influences, heat and overstripe bleeding is obtained. The colour is unchanged after 2000 hours' exposure in a WEATHER-OMETER.

EXAMPLE 10

0.5 part of the pigment of Example 1 together with 2 parts of a 60% aluminium paste in paraffin and xylene (registered trademark Alcoa 726) are soaked in 9.5 parts of a mixture of xylene and toluene (1:1), 1 part of methyl isobutyl ketone and 1 part of butyl acetate. The mixture is kept overnight and stirred for 2 hours on the following day. Then 58 parts of a 53% solution of a crosslinking thermohardening polyacrylate in a 3:1 mixture of xylene/butanol (registered trademark Baycryl L 350, available from Bayer AG, Leverkusen) and 28 parts of a 55% solution of a melamine resin in butanol (registered trademark Maprenal TTX, available from Cassella Farbwerke AG) are added gradually. The batch is then stirred for 30 minutes. The resultant lacquer is sprayed on metal and stoved at 120°-130° C. to give red metal finish colourations of excellent fastness to atmospheric influences. The colourations are virtually unchanged after 2000 hours' exposure to weathering in a WEATHER-OMETER.

EXAMPLE 11

80 g of an unsaturated liquid polyester resin, 19.72 g of monostyrene and 0.28 g of a cobalt siccative which contains 16% of cobalt, are ground for 48 hours in a ball mill with 1 g of the pigment obtained according to Example 1 and 5 g of titanium dioxide (rutile). Shortly before this lacquer is applied, a mixture consisting of 4.15 g of cumene hydroperoxide (70%), 2.42 g of ethyl acetate and 13.33 g of butyl acetate is added. Cardboard is coated with this mixture and dried in the air to give an orange coating of very good fastness to light, heat and overstripe bleeding.

EXAMPLE 12

1 part of a preparation consisting of 50% of the pigment of Example 1 and 50% of a copolymer of 75% of vinyl chloride and 25% of vinyl acetate is mixed with 99 parts of stabilised rigid PVC in powder form in a high-speed mixer, and the mixture is moulded at 180° C. to scarlet profiles of excellent fastness to light and atmospheric influences.

EXAMPLE 13

0.2 g of the pigment of Example 1 and 100 g of polystyrene granules are mixed and processed on a roll mill at 130° C. until a homogeneous colouration is obtained. The composition is then pressed between chromed plates to sheets at 150° C. The orange colouration of the sheets is of good light-fastness. The pigmentation can also be carried out in an extruder instead of on a roll mill. In addition, it is also possible to granulate the homogeneously pigmented composition and to mould it in an injection moulding machine.

EXAMPLE 14

100 g of a formaldehyde/urea resin in powder form which is suitable for moulding materials, 10 g of lithopone and 1 g of the pigment prepared in accordance with Example 1, are ground for 16 hours in a ball mill. The composition is subsequently pressed at 140°-160° C. into moulds. The orange samples have good light-fastness and heat resistance.

EXAMPLE 15

0.2 g of the pigment obtained in Example 1, 1 g of titanium dioxide (rutile) and 100 g of LD polyethylene granules are mixed in a drum and the mixture is then processed on mixer rolls at 130° C. The plastic mass is then pressed hot to sheets or moulded in an extruder. The sheets have a pleasing orange shade of good light-fastness.

What is claimed is:

1. A pigmented composition comprising
   (a) a high-molecular weight polymer lacquer resin selected from the group consisting of an alkyd-melamine-formaldehyde resin, an alkyd-urea-formaldehyde resin, a thermoplastic acrylic resin, a thermoset acrylic resin, an epoxy resin and a polyurethane resin, into which is incorporated
   (b) an effective amount of a finely dispersed pigment compound of formula I

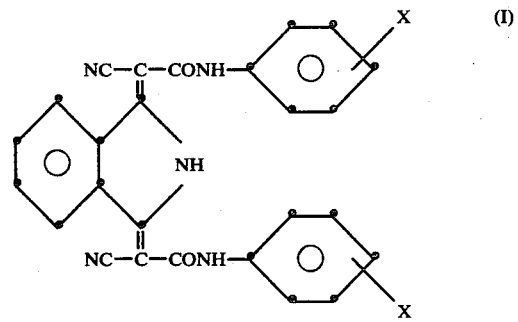

in which X is a meta- or para-positioned fluorine, chlorine or bromine atom, which pigment compound has a specific surface area of at least 10 m²/g and which compound is insoluble in said polymer.

2. A composition according to claim 1 where in the compound of formula I, X is a para-positioned chlorine atom.

* * * * *